(12) United States Patent
Liu et al.

(10) Patent No.: US 10,158,625 B2
(45) Date of Patent: Dec. 18, 2018

(54) METHODS AND APPARATUS OF KEY PAIRING FOR D2D DEVICES UNDER DIFFERENT D2D AREAS

(71) Applicant: Nokia Technologies Oy, Espoo (FI)

(72) Inventors: Yang Liu, Beijing (CN); Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 32 days.

(21) Appl. No.: 15/022,024

(22) PCT Filed: Sep. 27, 2013

(86) PCT No.: PCT/CN2013/084455
§ 371 (c)(1),
(2) Date: Mar. 15, 2016

(87) PCT Pub. No.: WO2015/042871
PCT Pub. Date: Apr. 2, 2015

(65) Prior Publication Data
US 2016/0226857 A1    Aug. 4, 2016

(51) Int. Cl.
*H04L 29/06* (2006.01)
*H04W 76/14* (2018.01)
(Continued)

(52) U.S. Cl.
CPC .......... *H04L 63/083* (2013.01); *H04L 63/06* (2013.01); *H04W 12/04* (2013.01); *H04W 76/14* (2018.02); *H04W 12/06* (2013.01)

(58) Field of Classification Search
CPC ...... H04L 63/083; H04L 63/06; H04W 12/04; H04W 76/023; H04W 12/06; H04W 76/14
See application file for complete search history.

(56) References Cited

U.S. PATENT DOCUMENTS 8,989,389 B2 * 3/2015 Hakola ............... H04W 12/04
380/279
2006/0149676 A1 * 7/2006 Sprunk ............... H04L 9/0822
705/50
(Continued)

FOREIGN PATENT DOCUMENTS

CN        101267303 A    9/2008
DE        10214431 A1    10/2003
(Continued)

OTHER PUBLICATIONS

Al-Bakri et al., "Securing Peer-to-Peer Mobile Communications Using Public Key Cryptography: New Security Strategy", International Journal of the Physical Sciences, vol. 6, Feb. 18, 2011, pp. 930-938.
(Continued)

*Primary Examiner* — Ghodrat Jamshidi

(57) ABSTRACT

Methods and apparatus are provided for key pairing between peer D2D UEs in different eNBs or D2D areas. A method may comprise: receiving at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area; identifying a second access network node serving the second D2D area based on the identification; sending to the second access network node, a request for a security context of the second user equipment; and receiving from the second access network node the security context for obtaining the keys for the D2D communication.

12 Claims, 7 Drawing Sheets

(51) Int. Cl.
*H04W 12/04* (2009.01)
*H04W 12/06* (2009.01)

(56) References Cited

U.S. PATENT DOCUMENTS

| | | | |
|---|---|---|---|
| 2011/0258327 A1 | 10/2011 | Phan et al. | |
| 2012/0239933 A1* | 9/2012 | Gamer | H04L 9/083 713/171 |
| 2012/0314866 A1 | 12/2012 | Horneman et al. | |
| 2013/0013926 A1 | 1/2013 | Hakola et al. | |
| 2013/0102314 A1 | 4/2013 | Koskela et al. | |
| 2013/0115872 A1* | 5/2013 | Huang | H04W 4/02 455/3.01 |
| 2013/0130727 A1 | 5/2013 | Hakola et al. | |
| 2013/0183963 A1 | 7/2013 | Turtinen et al. | |
| 2013/0196694 A1* | 8/2013 | Vanderveen | H04W 64/00 455/458 |

FOREIGN PATENT DOCUMENTS

| | | |
|---|---|---|
| EP | 1274046 A1 | 1/2003 |
| JP | 2002-366964 A | 12/2002 |
| WO | 2011/147462 A1 | 12/2011 |
| WO | 2013/062351 A1 | 5/2013 |
| WO | 2013123643 A1 | 8/2013 |
| WO | 2014/205697 A1 | 12/2014 |

OTHER PUBLICATIONS

Jehan et al., "Cati Dance: Self-Edited, Self-Synchronized Music Video", in Conference Abstracts and Applications of SIGGRAPH, Jul. 27-31, 2003, 1 Page.

Ciarlini et al., "A Logic-Based Tool for Interactive Generation and Dramatization of Stories", Proceedings of the 2005 ACM SIGCHI International Conference on Advances in computer entertainment technology, Jun. 15-17, 2005, pp. 133-140.

Seppanen, "Computational Models of Musical Meter Recognition", Thesis, Nov. 2001, 80 pages.

Partial Supplementary European Search Report received for corresponding European Patent Application No. 13894222.2, dated May 3, 2017, 9 pages.

"3rd Generation Partnership Project; Technical Specification Group Services and System Aspects Study on security issues to support Proximity Services (Release 12)", 3GPP TR 33.cde V0.2.0, Jul. 2013, pp. 1-21.

International Search Report and Written Opinion received for corresponding Patent Cooperation Treaty Application No. PCT/CN2013/084455, dated Jul. 16, 2014, 17 pages.

Extended European Search Report received for corresponding European Patent Application No. 13894222.2, dated Aug. 8, 2017, 8 pages.

* cited by examiner

400

- 410 — receive at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area;

- 420 — identify a second access network node serving the second D2D area based on the identification;

- 430 — send to the second access network node, a request for a security context of the second user equipment;

- 440 — receive from the second access network node the security context for obtaining the keys for the D2D communication.

610 — receive at a first access network node, a message indicating that a user equipment is going to move from a first D2D area served by the first access network node to a second D2D area served by a second access network node 620 — in response to the message, forward a security context for D2D services of the user equipment to the second access network node 630 — receive from the second access network node, an indication of releasing the security context for D2D services of the user equipment 640 — remove the security context in response to the indication

FIG. 6

METHODS AND APPARATUS OF KEY PAIRING FOR D2D DEVICES UNDER DIFFERENT D2D AREAS

RELATED APPLICATION

This application was originally filed as Patent Cooperation Treaty Application No. PCT/CN2013/084455 filed Sep. 27, 2013.

FIELD OF THE INVENTION

The present invention generally relates to network-controlled device-to-device (herein after also referred to as "D2D") communications. More specifically, the invention relates to enhanced methods for key pairing for D2D devices under different D2D areas and related apparatus.

BACKGROUND

With the development of the future service, next generation wireless communication systems, such as 3GPP (third Generation Partnership Project) LTE (long term evolution) and beyond system, IMT-A (International Mobile Telecommunications-Advanced) system etc., are introduced to satisfy high speed, large capacity, and a high QoS (Quality of Service) for billions of subscribers. In this regard, efforts have been made to realize network-controlled D2D communications for reducing the load on the cellular communication network. Examples of such D2D communications include direct communications among a cluster of proximity devices, and autonomous D2D communications in a cellular network. In such network-controlled D2D communications, devices such as user equipments (UE) or terminals directly communicate with each other, instead of conveying data from one device to the other via the cellular network (in particular via an access node or base station thereof), wherein primary control and configurations, such as channel/bearer configurations, may be carried out by the cellular network.

Security protection may be an issue for the network-controlled D2D communications, for example, because malicious users may be able to eavesdrop on the D2D communication if no strong security protection between peer UEs conducting a direct D2D communication is used. According to the current security mechanism, the key generation for network-controlled D2D communications are managed and controlled by the core network. The core network, especially apparatus for key management (such as MME (Mobility Management Entity), HSS (Home Subscriber Server), and/or the like) needs to be involved in an establishment and key negotiation of every D2D connection. This may highly increase the signaling burden of the core network, for example in a case that the number of UEs conducting D2D communications is huge.

An enhanced security key generation method has been proposed to enable the D2D security key generation without involving a core network, which provides a basic feasible solution for D2D security key handling. However, this solution is provided to solve the problem in intra-eNB cases where both of the D2D pairs are under a same eNB or D2D area. The key generation, especially key pairing in the scenario where D2D devices are under different eNBs or D2D areas, is not considered yet. In view of this, it would be advancement in the art to provide an approach of key pairing for D2D devices under different eNBs or D2D areas.

Some Example Embodiments

To overcome limitations described above, and to overcome other limitations that will be apparent upon reading and understanding the present specification, the disclosure provides an approach for key pairing between peer D2D UEs in different eNBs or D2D areas.

According to one embodiment, a method comprises receiving at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area. The method further comprises identifying a second access network node serving the second D2D area based on the identification. The method further comprises sending to the second access network node, a request for a security context of the second user equipment. The method further comprises receiving from the second access network node the security context for a generation of keys for the D2D communication.

In some exemplary embodiments, the security context of the second user equipment may comprise a user apparatus-specific key which is shared between the second user equipment and the second access network node.

In some exemplary embodiments, the method may further comprise obtaining the keys for the D2D communication based on the security context of the second user equipment; and sending the keys for the D2D communication to the first user equipment.

In some exemplary embodiments, the first access network node may be an enhanced Node B or a D2D registration server function server. In some exemplary embodiments, the second access network node may be an enhanced Node B or a D2D registration server function server.

According to another embodiment, an apparatus comprising at least one processor, and at least one memory including computer program code, the at least one memory and the computer program code configured to, with the at least one processor, cause, at least in part, the apparatus to receive at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area. The apparatus is further caused to identify a second access network node serving the second D2D area based on the identification. The apparatus is further caused to send to the second access network node, a request for a security context of the second user equipment. The apparatus is further caused to receive from the second access network node the security context for obtaining the keys for the D2D communication.

According to another embodiment, a computer-readable storage medium carrying one or more sequences of one or more instructions which, when executed by one or more processors, cause, at least in part, an apparatus to receive at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area. The apparatus is further caused to identify a second access network node serving the second D2D area based on the identification. The apparatus is further caused to send to the second access network node, a request for a security context of the second user equipment. The apparatus is further caused to receive from the second access network node the security context for obtaining the keys for the D2D communication.

According to another embodiment, an apparatus comprises means for receiving at a first access network node serving a first D2D area from a first user equipment in the first D2D area, a request for keys for a D2D communication between the first user equipment and a second user equipment, wherein the request comprises an identification of a second D2D area where the second user equipment is located and being different from the first D2D area. The apparatus further comprises means for identifying a second access network node serving the second D2D area based on the identification. The apparatus further comprises means for sending to the second access network node, a request for a security context of the second user equipment. The apparatus further comprises means for receiving from the second access network node the security context for obtaining the keys for the D2D communication.

According to one embodiment, a method comprises receiving at a first user equipment, a notification of D2D services from a second user equipment, wherein the notification comprises an identification of a second D2D area where the second user equipment is located, and the first user equipment is in a first D2D area different from the second D2D area. The method further comprises sending to a first access network node serving the first D2D area, a request for keys for a D2D communication between the first user equipment and the second user equipment, wherein the request comprises the received identification so that a security context of the second user equipment is available for the first access network node from a second access network node serving the second D2D area. The method further comprises in response to the request, receiving the keys for the D2D communication which are obtained by the first access network node based on the security context.

In some exemplary embodiments, the method may further comprise broadcasting a notification of D2D services, wherein the notification indicates an identification of a D2D area where the first user equipment is located.

According to one embodiment, a method comprises receiving at a first access network node, a message indicating that a user equipment is going to move from a first D2D area served by the first access network node to a second D2D area served by a second access network node. The method further comprises in response to the message, forwarding a security context for D2D services of the user equipment to the second access network node.

In an exemplary embodiment, the method may further comprise receiving from the second access network node, an indication of releasing the security context for D2D services of the user equipment; and removing the security context in response to the indication.

In an exemplary embodiment, the message comprises an identification of the second device-to-device area. In an exemplary embodiment, the method may further comprise receiving a relocated identification of the user equipment from a core network node; and updating the security context by associating the relocated identification with the user apparatus-specific key.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for key pairing between peer D2D UEs in different eNBs or D2D areas, according to one embodiment;

FIG. 6 is a flowchart of a process for key pairing between peer D2D UEs in different eNBs or D2D areas, according to one embodiment.

DESCRIPTION OF SOME EMBODIMENTS

Figure 1:
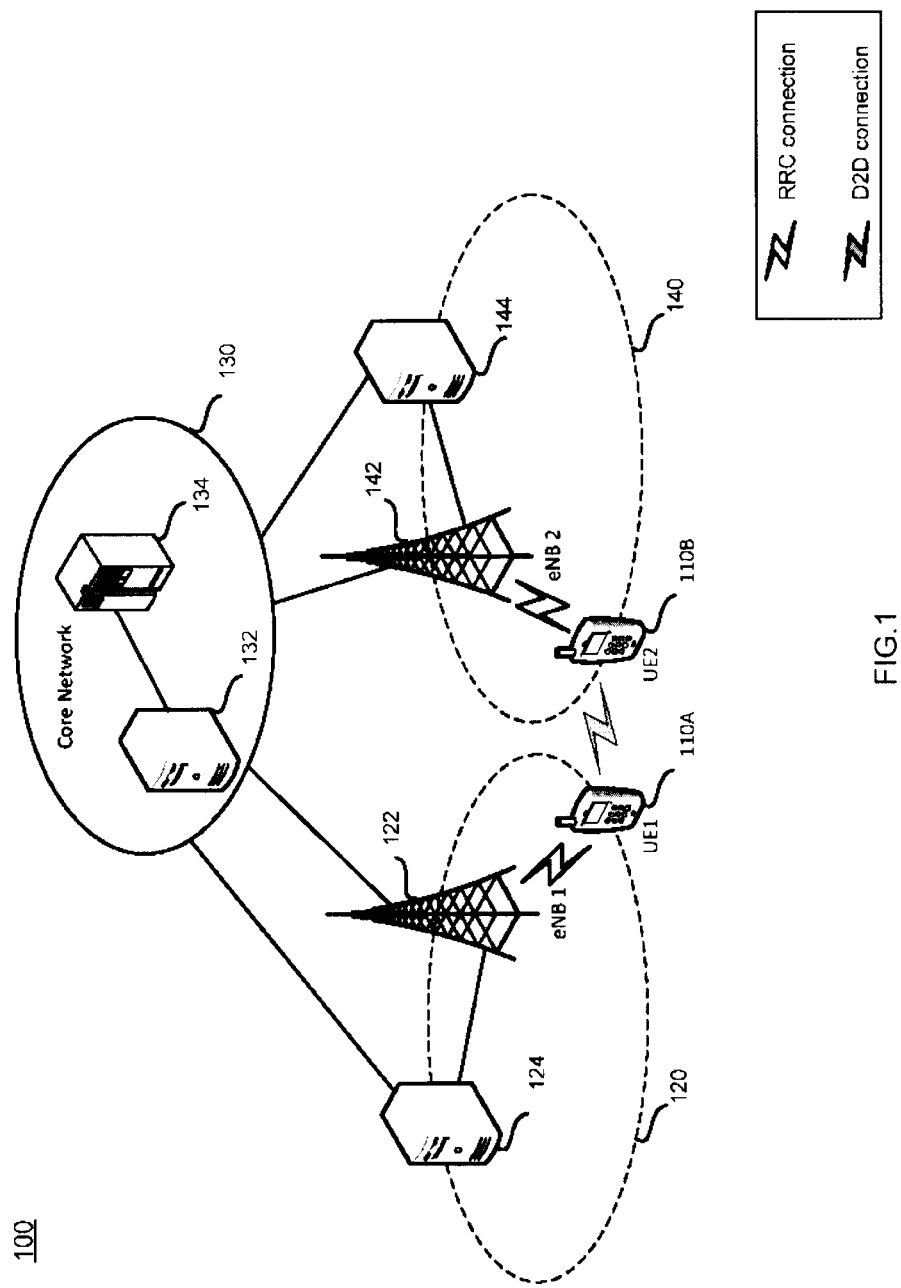
FIG. 1 is a wireless communication system in which at least one embodiment of the present invention may be implemented.

Examples of a method, apparatus, and computer program for key pairing between peer D2D UEs in different eNBs or D2D areas are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

FIG. 1 is a wireless communication system in which at least one embodiment of the present invention may be implemented. Generally, a wireless communication system includes a radio access network and a core network. The radio access network controls a cell and certain UEs operating within that cell, to provide a wireless access to the core network. As shown in FIG. 1, a radio access network may comprises base stations 122, 142, which may support a corresponding service or coverage areas (also referred to as a cell) 120, 140. The base stations 122, 142 are also capable of communicating with wireless devices, such as user equipments 110A, 110B, within the coverage areas. Although FIG. 1 depicts two base stations 122, 124 and two user equipments (UEs) 110A, 110B in the radio access network, other quantities of base stations and UEs may be implemented as well.

In some implementations, the base stations 122, 142 may be implemented as an evolved Node B (eNB) type base station consistent with standards, including the Long Term Evolution (LTE) standards. The UEs 110A, 110B may be mobile and/or stationary. Moreover, the UEs 110A, 110B may be referred to as, for example, devices, mobile stations, mobile units, subscriber stations, wireless terminals, terminals, or the like. The UEs may be implemented as, for example, a wireless handheld device, a wireless plug-in accessory, or the like. For example, the UE may take the form of a wireless phone, a computer with a wireless connection to a network, or the like. In some cases, the UE may include one or more of the following: at least one processor, at least one computer-readable storage medium (e.g., memory, storage, and the like), a radio access mechanism, and a user interface. The core network 130 comprises the conventional network elements and function of a cellular communication network, such as MME 132 (Mobility Management Entity), HSS (Home Subscriber Server) 134, etc. Network elements in the core network may be organized in a basic structure and operate in a basic way well known to one skilled in the art.

In embodiments of the present invention, the wireless communication system 100 is configured to further support network-controlled D2D communications. In this regard, a D2D feature is integrated into the public land mobile systems, such as the 3rd Generation Partnership Project (3GPP) as well as subsequent generations of cellular communication systems. The cellular communication systems, such as the eNBs 122, 124, MME 132 or other network elements, may be used to aid in the establishment and ongoing control of the D2D communications, e.g., radio resources allocation of the D2D communications, switch control, etc. In other words, the UEs may communicate with each other either via the cellular communication system (in particular via eNBs 122, 124), or via a direct D2D communication. As shown at FIG. 1, UE 110A is under control of the eNB 122, UE 110B is under control of the eNB 124, and UE 110A and UE 110B may communicate with each other directly.

To make the management for D2D communications more feasible and efficiently, a DRSF (D2D Registration Server Function) server may be introduced for registration, authentication and identification of D2D users. A D2D user in a D2D registration area may register to the DRSF of the D2D registration area with a D2D user ID and a temporary UE ID (e.g. S-TMSI). A DRSF server may be located in a radio access network entity (e.g. an eNB) or in core network entity (e.g. MME) or in both with a hierarchical structure. In a case that a DRSF server is located in a radio access network, the DSRF may be implemented in either centralized or distributed way.

For a centralized DRSF, a D2D registration area may be limited within the control area of one RAN element. For instance, if a DRSF server is located in an eNB, the D2D registration area (may also be called as D2D area herein after) may be limited to the cell controlled by one eNB, such as the cells 120, 140. Having centralized DRSF in one RAN may shorten the time for D2D connection setup as less network entities and signaling are involved in procedures of D2D connection setup, but requires more frequent D2D registration. That is, a D2D registration needs to be performed again when a user equipment moves to a new D2D area.

For a distributed DRSF, a D2D area may be extended into the coverage area controlled by multiple RAN elements to avoid frequent D2D registrations. A D2D area may be identified by an identification which is associated the corresponding DRSF server controlling and serve the D2D area. In this case, D2D related control (e.g. D2D paging, D2D connection setup etc.) signaling needs to be traversed over the RAN elements interface (e.g. X2 interface in E-UTRAN).

Traditionally, the security protection of the direct D2D communications is also provided by virtue of the sophisticate security mechanism of the cellular communication system. For example, security key derivations for securing the direct D2D communications may be controlled by the core network including the MME 132 and HSS 134. As shown in FIG. 1, when UE1 and UE2 are in different D2D areas, traditionally they will request the core network (e.g. MME 132) to generate a security key for a D2D service between them. Usually for a given D2D area, there may be lots of D2D UEs operating in D2D services, and there may be lots of eNBs and DRSF servers under the control of one core network. Hence it will bother the core network 130 (or MME 132) to generate every single security key for a respective D2D service, which is a potential challenge from the point of view of the core network.

A solution has been provided to support key generation of network-controlled D2D communication with less signaling impact to the core network, as is described for example, in a PCT patent application PCT/CN2013/078054 of the present inventors, entitled "Methods and Apparatus For Generating Keys In Device-to-Device Communications" and filed on Jun. 26, 2013, the contents of which are hereby incorporated by reference in its entirety. In this solution, an eNB or DRSF sever may retrieve or receive from a MME a UE-specific key of a D2D UE which is originally shared between the D2D UE and the MME, and then maintain and utilize the UE-specific key for generating keys for D2D communications of the D2D UE. As proposed in this PCT patent application, when one or more adjacent D2D UEs detect a notification of D2D service from a D2D UE and decide to establish a D2D connection with the D2D UE, the adjacent UEs may request the eNB or DRSF server to generate keys for D2D communications between D2D UE and the adjacent D2D UEs. In a scenario where both of the D2D UE and the adjacent D2D UEs are in a same D2D area served by an eNB or a DRSF server, the eNB or DRSF server may identify the D2D UE from the request, and generate keys for D2D communications between D2D UE and the adjacent D2D UEs based on the UE-specific key of the D2D UE in response to the request. However, in a scenario where the D2D UE and the adjacent D2D UEs are in different D2D areas, the eNB or DRSF server serving the adjacent D2D UEs may not be able to identify the D2D UE, and has no knowledge on the UE-specific key of the D2D UE. Then, there is a problem with how to retrieve a UE-specific key of a D2D UE (e.g. UE1 of FIG. 1) for adjacent D2D UEs (e.g. UE2 of FIG. 1).

Figure 2:
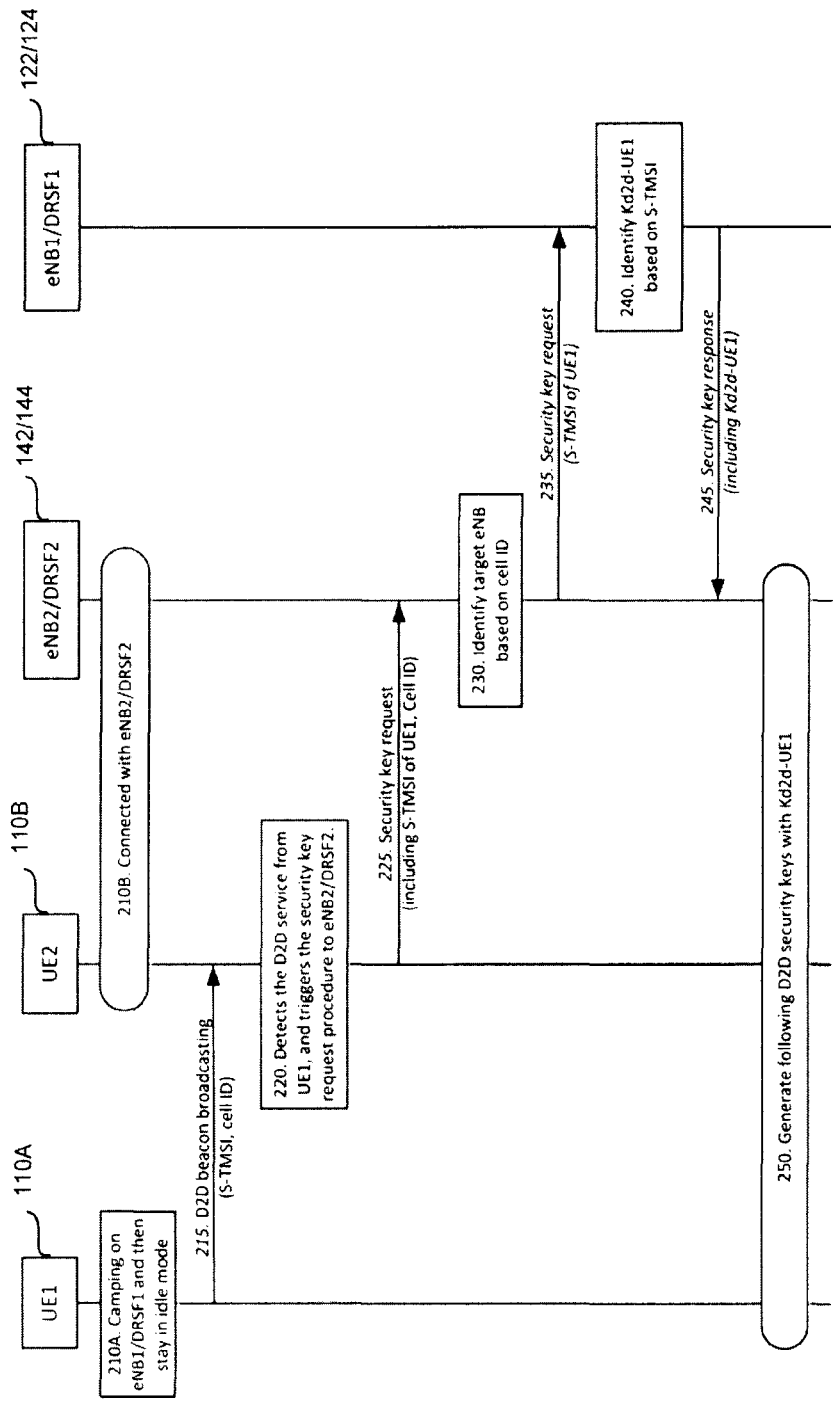
FIG. 2 depicts an example timing diagram illustrating a procedure for key pairing between peer D2D UEs in different eNBs or D2D areas, according to an embodiment of the present invention.

Exemplary embodiments of the present invention are provided to support an acquisition of a D2D security key when the peer D2D devices are in different D2D areas. FIG. 2 depicts an example timing diagram illustrating a procedure of key pairing between D2D UEs in different D2D areas according to an embodiment of the present invention. Assume for explanation that a DRSF server is deployed in a radio access network. As used herein, the expression form "eNB/DRSF" refers to an access network node, such as an eNB1 122 or a DRSF1 server 124 controlling a D2D area where the UE1 is located, or an eNB2 142 or a DRSF2 server 144 controlling a D2D area where the UE2 is located. Although FIG. 1 illustrates the DRSF servers 124, 144 as an entity separate and distinct from any of the access network elements, in practice the function of the server 124, 144 may be incorporated in any apparatus (for example, in the eNB 122, 142 respectively) of the radio access network. The eNBs and DRSFs may communicate with each another directly or via some intermediate node, such as a MME.

Referring to FIG. 2, UE1 110A is camping on eNB1/DRSF1 at 210A, and then registered to eNB1 or DRSF1 for potential D2D services. As illustrated in FIG. 1, eNB1 or DRSF1 controls a D2D area where UE1 is currently located in, for D2D services in this D2D area. This registration may be performed as D2D area registration. With the registration, the eNB1/DRSF1 may establish a security context of UE1 for securing D2D services of UE1. In this regard, the eNB1/DRSF1 may store and maintain an association between a UE-specific key (denoted as $K_{d2d-UE1}$) of the UE1 with the identity (e.g. UE1's S-TMSI) of UE1. The key $K_{d2d-UE1}$ may be shared between the UE1 and the eNB1/DRSF1. For example, $K_{d2d-UE1}$ may be originally generated at the UE1 and the MME 132, based on a NAS key (e.g. $K_{asme}$ of UE1) shared between the UE1 and the MME 132, and may be sent from the MME to the eNB1/DRSF1, for example during a registration of the UE1 to the eNB1/DRSF1. In some exemplary embodiments, the security context of UE1 including $K_{d2d-UE1}$, may be transferred from an eNB/DRSF controlling a D2D area where UE1 is previously located in, to the current eNB1/DRSF1. Details of the transfer of security context will be discussed later with reference to FIG. 3.

In some embodiments, UE1 may stay in RRC (Radio Resource Control) idle mode after camping on eNB1/DRSF1. For example, UE1 may stay in RRC idle mode as specified in LTE protocols. Then, there may be no RRC connection established between the UE1 and the eNB1. As a device capable of D2D communication, UE1 may broadcast notifications for D2D services to its adjacent D2D UEs when it wants D2D communications, even if it stays in RRC idle mode. For example at 215, UE1 may broadcast a notification for D2D services, for example in a D2D beacon. The notification identifies UE1 as the originator of the D2D services with UE1's identity. For example, the notification may indicate UE1's own S-IMSI (Short-Temporary Mobile Subscriber Identity), the D2D services, . . . , and so on. Especially, UE1 also broadcasts the identification of a D2D area where UE1 is currently located in. For example, the notification may also comprise a cell ID of the cell UE1 is currently camping on. Although as illustrated in FIG. 2, UE1 is in idle mode while broadcast the notification, the notification may also be broadcasted while UE1 is in RRC connected mode.

Then, one or more adjacent D2D UEs (e.g. UE2 110B) may detect the D2D beacons broadcasted from UE1, and decide to establish a D2D connection with UE1. From the notification in detected D2D beacons, UE2 may obtain the identity (e.g. S-TMSI) of UE1 and the D2D area where UE1 is currently located in, and trigger a procedure to request security keys for protecting the D2D communication to be performed between UE1 and UE2. As illustrated at block 225, UE2 110B may send a request message for the security keys to its serving eNB/DRSF, i.e. eNB2/DRSF2, including the S-TMSI of UE1 and the identification (e.g. cell ID of eNB2) of the D2D area where UE1 is currently located in. The request message may be transmitted through a RRC connection between UE2 and the eNB 142. In some exemplary embodiments, UE2 may have an activate RRC connection with the eNB2 or DRSF2 at the moment of deciding to establish a D2D communication connection with UE1. In the case that there is no RRC connection between UE2 and the eNB2/DRSF2, UE2 may initiate a RRC connection setup procedure to eNB2 (not shown in FIG. 2).

Based on the identification of the D2D area where UE1 is currently located in, eNB2/DRSF2 may identify the eNB1/DRSF1 which is serving the UE1, at 230. For example, eNB2 is able to identify the eNB ID based on the cell ID of UE1 provided by UE2, i.e. based on the leftmost 20 bit of the cell ID. Thus, eNB2/DRSF2 may obtain security context of UE1 from eNB1/DRSF1. As shown at 235, eNB2/DRSF2 may send a request for UE1's UE-specific security key (e.g. $K_{d2d-UE1}$) to eNB1/DRSF1, indicating the S-TMSI of UE1. In response, eNB1/DRSF1 may identify the $K_{d2d-UE1}$ of UE1 based on the S-TMSI information of UE1 at 240, and send this security key ($K_{d2d-UE1}$) to eNB2/DRSF2 at 245.

Based on the received security context of UE1, the eNB2/DRSF2 may obtain keys for securing the D2D communications between UE1 and UE2. For example, the received security context of UE1 may comprise a particular sequence number, which may be mapped into one or more security keys indexed, for example, in the eNB2/DRSF2 or a database. Then, with the information of the security context of UE1, the eNB2/DRSF2 may identify or retrieve the matched keys for securing the D2D communications between UE1 and UE2. In some embodiments, the received security context of UE1 may comprise a UE-specific key $K_{d2d-UE1}$. Based on the $K_{d2d-UE1}$ and some security parameters, the eNB2/DRSF2 may generate or derive keys for securing the D2D communication to be performed between UE1 and UE2. For example, the keys for securing the D2D communication may be generated and distributed in a way as proposed in the related PCT patent application PCT/CN2013/078054, the contents of which are hereby incorporated by reference in its entirety. For example, eNB2/DRSF2 may generate a key $K_{d2d\_serv}$ based on the $K_{d2d-UE1}$ and a random number, and provide the $K_{d2d\_serv}$ to the UE2 together with the random number. The UE2 may store the $K_{d2d\_serv}$ as a security key for the D2D communication with UE1, and forward the random number to the UE1. With the received random number, the UE1 may derive the $K_{d2d\_serv}$ based on the $K_{d2d-UE1}$. As such, a common cryptography key, $K_{d2d\_serv}$ may be shared between the UE1 and the UE2 without interrupting the core network. In such a way, when the D2D UE pairs are served by different eNBs or in different D2D areas, it is still possible to obtain the D2D security keys for them UEs without involving core network side, even if the D2D UE pairs are in idle mode. This will relieve the burden of the core network greatly, especially in a case of large amounts of D2D users.

Figure 3:
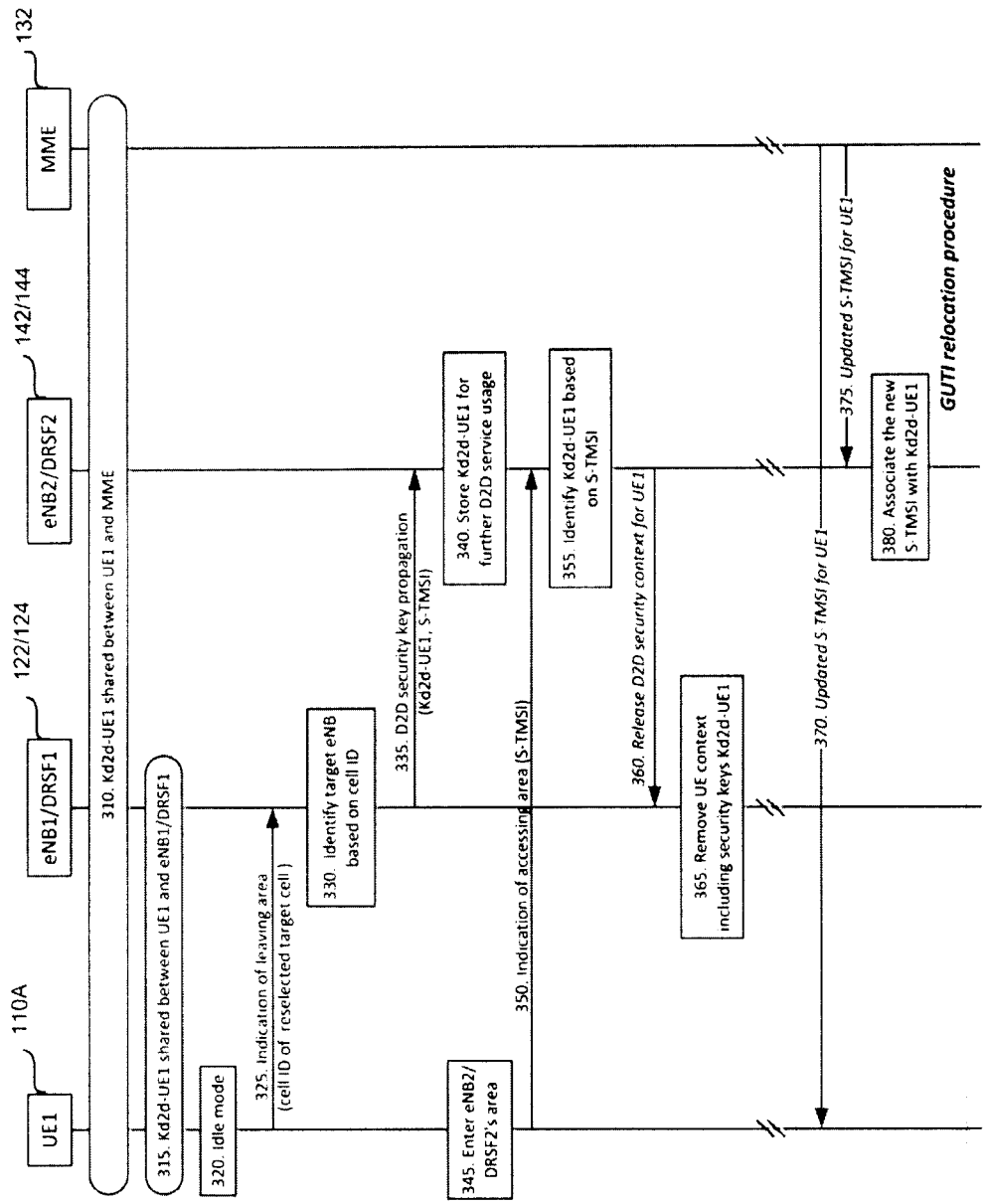
FIG. 3 depicts an example timing diagram illustrating a procedure for key pairing between peer D2D UEs in different eNBs or D2D areas, according to another embodiment of the present invention.

As discussed above, in some embodiments, the security context of a D2D UE may be transferred from a first eNB/DRSF to a second eNB/DRSF when the D2D UE is moving from a D2D area of the first eNB/DRSF to a D2D area of the second eNB/DRSF. FIG. 3 illustrates such an embodiment. As shown at 310 and 320, UE1 may share a UE-specific key (e.g. $K_{d2d-UE1}$) for D2D services of UE1 with the eNB1/DRSF1 and the MME, for example, according to solutions defined in the PCT patent application PCT/CN2013/078054. For example, the key $K_{d2d-UE1}$ may be generated both at the UE1 and at the MME 132, based on a NAS key (e.g. $K_{asme}$ of UE1) shared between the UE1 and the MME 132 during an initial attach procedure to the core network, and may be provided by the MME to the eNB1/DRSF1 which the UE1 is registered. Then, the eNB1/DRSF1 may maintain a security context of UE1 for D2D services of UE1, including the UE-specific key $K_{d2d-UE1}$ of UE1.

After a registration to the eNB1/DRSF1, UE1 may return to RRC idle mode. In the idle mode, UE1 may move across different eNBs/DRFSs or different D2D areas. For example, UE1 may detect that it is moving toward another D2D area, and going to reselect that another D2D area which belong to eNB2/DRSF2. When a reselection of D2D area is about to happen for a D2D UE, the UE may trigger a de-registration to its current registered eNB/DRSF. In this de-registration procedure, UE1 may indicate the reselected D2D area to its current eNB/DRSF. For example, UE1 may send a message to eNB1/DRSF1, indicating that it is going to move from the D2D area of eNB1/DRSF1 to the D2D area of eNB2/DRSF2. The message may include an identification of the reselected target D2D area, e.g. a cell ID of eNB2, as shown at 325.

In response to a receipt of the message, the eNB1/DRSF1 identifies the eNB/DRSF controlling the reselected target D2D area, and forwards a security context of UE1 (e.g. including the key $K_{d2d-UE1}$) to it. For example, based on the identification of the reselected D2D area provided by UE1 (e.g. cell ID of eNB2), eNB1 may send UE1's S-TMSI and the associated $K_{d2d-UE1}$ to eNB2, via a D2D security key propagation message. The D2D security key propagation message could be a new X2AP message or be integrated with any existing X2AP message. Then, the eNB2/DRSF2 may store this D2D security context for UE1, for example the key $K_{d2d-UE1}$, for further D2D services of UE1.

When UE1 enters the reselected D2D area of the eNB2/DRSF2 at 345, it may send an indication to eNB2/DRSF2, for example via a new procedure of D2D area registration. The identification of UE1 (e.g. S-TMSI) may be included in the registration message at 350. Based on the identification of UE1 and the received D2D security key propagation message, the eNB2/DRSF2 may identify the security context of UE1, e.g. the key $K_{d2d-UE1}$, at 355, and then indicate the eNB1/DRSF1 to release the security context for UE1 at 360. In response to the indication, the eNB1/DRSF1 may remove the security context for UE1, including the key $K_{d2d-UE1}$ at 365. Since it is hard to predict behaviors of a D2D UE in idle mode, there is no need to maintain a security context for a D2D UE permanently in an eNB or DRSF. In such a way, when a D2D UE is moving across different D2D areas (or across different eNBs) even in RRC idle mode, the D2D security context of the D2D UE is also able to be propagated among related D2D areas along with the UE's movement. Meanwhile, the core network is less involved for the security handling.

The security context of a UE may be maintained at an eNB/DRSF when the UE is in the D2D area of the eNB/DRSF. The identification of a D2D UE may be relocated by the core network (for example, a MME) after an initial attach procedure to the core network. For example, during a GUTI (Globally Unique Temporary UE Identity) relocation procedure, the MME may relocate a GUTI to UE1, which comprising a new S-TMSI for UE1. In some embodiments, in addition to inform the updated S-TMSI to UE1, the MME may also indicate the updated S-TMSI to the eNB/DRSF which is serving UE1 currently, e.g. eNB2/DRSF2, at 375. In response, the eNB2/DRSF2 will store this relocated S-TMSI, and then update the security context of UE1 by associating the key $K_{d2d-UE1}$ with the new S-TMSI.

Figure 5:
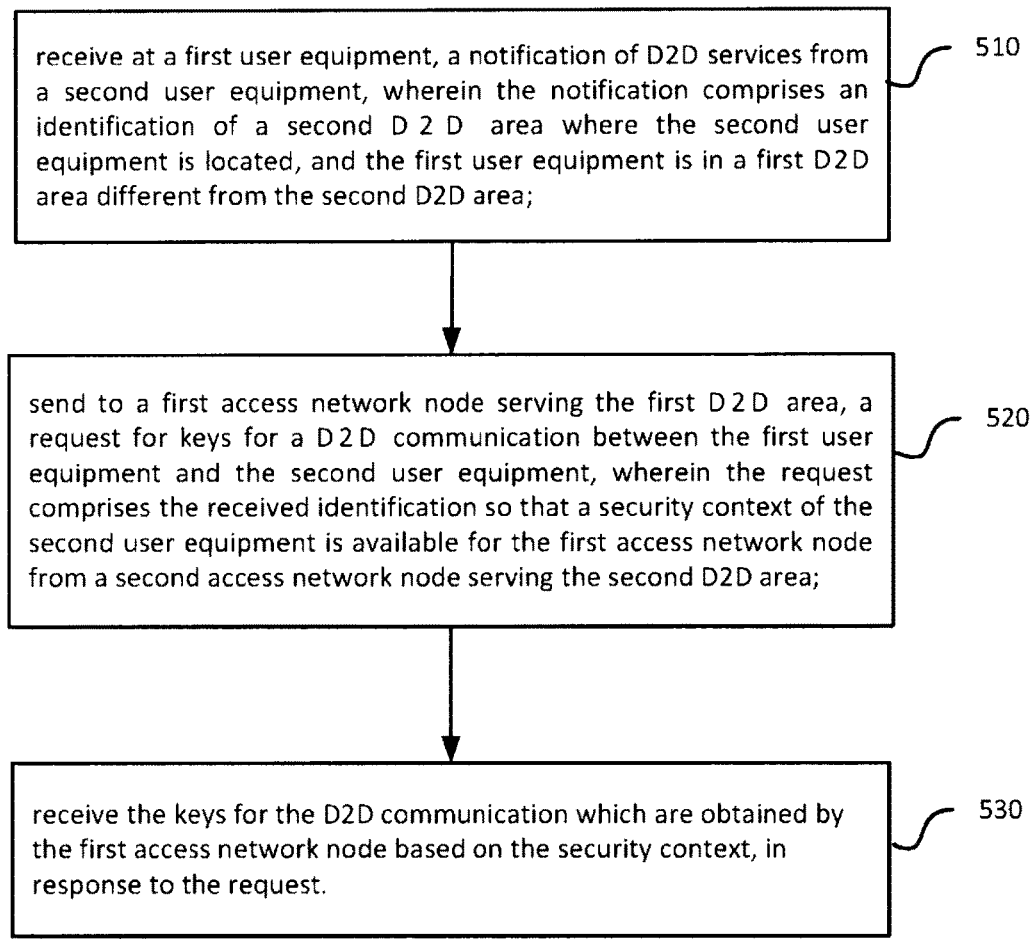
FIG. 5 is a flowchart of a process for key pairing between peer D2D UEs in different eNBs or D2D areas, according to one embodiment.
Figure 7:
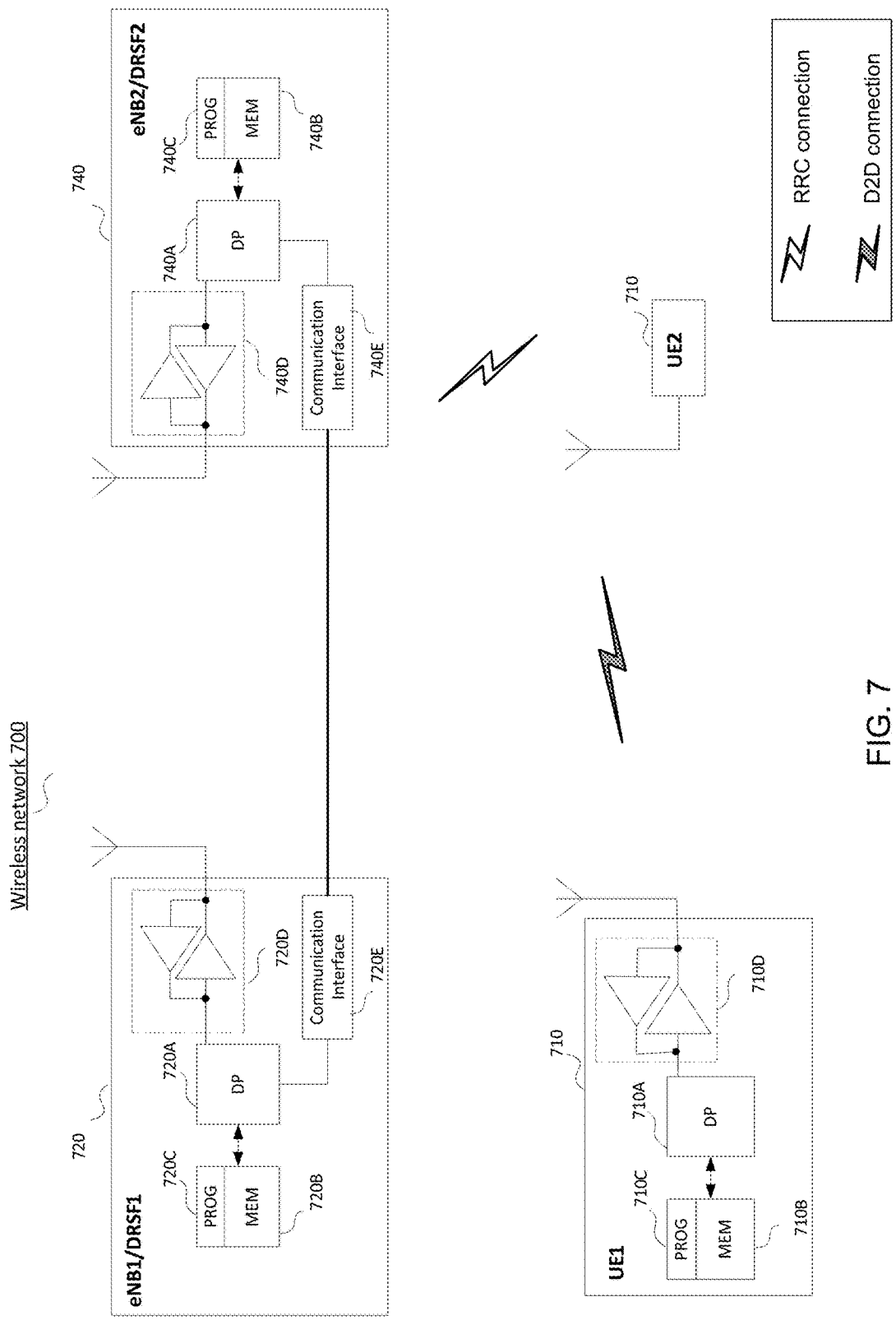
FIG. 7 is a simplified block diagram of various devices that are suitable for use in practicing various exemplary embodiments of the present invention.

FIGS. 4, 5, and 6 are logic flowcharts that illustrate the operations of methods, and a result of executions of computer program instructions, in accordance with the example embodiments of this invention for key generations for a network-controlled D2D communication. More specifically, FIGS. 4, 5, and 6 are descriptive of process flows among a D2D peer user equipment such as the UE1 and UE2, an access network node such as eNB1/DRSF1, and another access network node such as eNB2/DRSF2. In such an embodiment, the processes may be implemented in, for instance, a chip set including a processor and a memory as shown in FIG. 7. As such, an access network node may provide means for accomplishing various parts of the process 400 as well as means for accomplishing other processes in conjunction with other components, a user equipment may provide means for accomplishing various parts of the process 500 as well as means for accomplishing other processes in conjunction with other components, and an access network node may provide means for accomplishing various parts of the process 600 as well as means for accomplishing other processes in conjunction with other components.

In step 410, an access network node (such as the eNB2/DRSF2 in FIG. 2) serving a first D2D area receives from a first user equipment (such as the UE2 in FIG. 2) in the first D2D area, a request for keys for a D2D communication between the first user equipment (e.g. the UE2) and a second user equipment (such as the UE1). The request comprises an identification of a second D2D area where the second user equipment is located. The second D2D area is different from the first D2D area. For example, in a case that the second D2D area is served and controlled by the eNB1, the request may comprise a cell ID of the cell of the eNB1. The request may further comprise an identity of the second user equipment, e.g. a S-TMSI of the UE1.

In step 420, based on the received identification, the access network node (e.g. the eNB2/DRSF2) identifies an access network node serving the second D2D area, such as the eNB1/DRSF1 in FIG. 2. For example, based on the leftmost 20 bits of the cell ID of the cell of eNB1, the ID of eNB1 may be easily identified.

Next in step 430, a request for a security context of the second user equipment is sent to the identified access network node. The request indicates identity of the second user equipment, for example the S-TMSI of UE1 to the identified access network node.

Next in step 440, the security context may be received from the identified access network node, for obtaining the keys for the D2D communication. The keys for the D2D communication may be further provided to be first user equipment, and used for protecting a D2D communication between the first and second user equipments. The security context of the second user equipment may comprise a UE-specific key which has been shared between the second user equipment and the second access network node. For example, in an exemplary embodiment shown in FIG. 2, the security context of UE1 may comprise a D2D security key $K_{d2d-UE1}$, which may be generated based on a NAS key and shared among UE1, eNB1/DRSF1 and the core network node, such as MME.

In step 510, a user equipment (such as the UE2 in FIG. 2) receives a notification of D2D services from a second user equipment (such as the UE1 in FIG. 2). The notification comprises an identification of a second D2D area where the second user equipment is located, such as a cell ID of eNB2. The first user equipment is in a first D2D area different from the second D2D area.

Next in step 520, the user equipment sends to an access network node (such as the eNB2/DRSF2 in FIG. 2) serving the first D2D area, a request for keys for a D2D communication between the first user equipment and the second user equipment. The request comprises the received identification, so that a security context of the second user equipment is available for the first access network node from a second access network node serving the second D2D area, such as the eNB1/DRSF1 in FIG. 2. In step 530, the keys for the D2D communication which are obtained by the first access network node based on the security context is received, in response to the request.

In step 610, an access network node (such as the eNB1/DRSF1 in FIG. 3) receives a message indicating that a user equipment (such as the UE1 in FIG. 3) is going to move from a D2D area served by the access network node to a target D2D area served by another access network node (such as the eNB2/DRSF2 in FIG. 3). In response to the message, the access network node forwards a security context for D2D services of the user equipment to the second access network node, in step 620.

In some embodiments, the access network node may further receives from the another access network node, an indication of releasing the security context of the user equipment, in step 630. In response, the security context may be removed from the access network node, in step 640.

Now reference is made to FIG. 7 illustrating a simplified block diagram of various electronic devices that are suitable for use in practicing the exemplary embodiments of the present invention. In FIG. 7, a wireless communication network 700 may be adapted for communication with user equipments 710 (such as the UE1 110A and the UE2 110B) via base stations (such as the eNB 122, the eNB 142). The network 700 may further include access network nodes 720, 740, for a key generation of D2D services, such as the eNB 122/the DRSF server 124, the eNB 142/the DRSF server 144. The network 700 may further include a core network node (such as MME 132, not shown) for providing a NAS security for the user equipments. The UEs 110A and 110B may perform a cellular communication under the control of MME 132, the eNBs 122, 124. Furthermore, the UE1 110A and UE2 110B may perform a D2D communication directly between each other under the control of MME 132 and the eNBs 122, 142, and optionally under the control of DSRF servers 124, 144. The security context for D2D services of a UE may be transferred and propagated among access network nodes without introducing too much burden to a core network, according to the exemplary embodiments of the present invention as discussed above.

The UEs 710 may include a data processor (DP) 710A, a memory (MEM) 710B that stores a program (PROG) 710C, and a suitable radio frequency (RF) transceiver 710D for wireless communications with the eNB via one or more antennas. In an exemplary embodiment, the transceiver 710D in the UE1 may be used for D2D communications in both licensed band (e.g. cellular band) and unlicensed band (e.g. WLAN band). Alternatively, the transceiver 710D may comprise separate components to support D2D communications in licensed band (e.g. cellular band) and unlicensed band (e.g. WLAN band) respectively.

The access network node 720 includes a DP 720A, a MEM 720B that stores a PROG 720C, and a suitable communication interface 720E. The communication interface 720E may be able to communicate with the core network, such as MME 132. The communication interface 720E may be further able to communicate with other access network nodes, such as eNBs or DRSF servers. In some implementations that the access network node 720 is implemented as a DRSF server, the communication interface 720E may be further adapted to communicate with UEs via eNB. In some examples, the communication interface 720E may be used to transmit and receive information using protocols and methods associated with the network-controlled D2D communication. In some embodiments where the access network node 720 is implemented as an eNB, or in other words that a DRSF server is incorporated into eNB, the access network node 720 may further includes a suitable radio frequency (RF) transceiver 720D for wireless communications with the UEs via one or more antennas. The access network node 740 also includes a DP 740A, a MEM 740B that stores a PROG 740C, and a suitable communication interface 740E, which may be configured to operate in a same way as the access network node 720.

At least one of the PROGs 710C, 720C, 740C is assumed to include program instructions that, when executed by the associated DP, enable the electronic device to operate in accordance with the exemplary embodiments of this invention, as discussed above. That is, the exemplary embodiments of this invention may be implemented at least in part by computer software executable by the DP 710A of the UEs 710, by the DP 720A of the access network node 720, and by the DP 740A of the access network node 740, or by hardware, or by a combination of software and hardware. The basic structure and operation of UEs 710, the access network node 720 (e.g. eNB1 122 or DRSF1 124), and the access network node 640 (e.g. eNB2 142 or DRSF2 144) are known to one skilled in the art.

In general, the various embodiments of the UEs 710 may include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 710B, 720B, 740B may be of any type suitable to the local technical environment and may be implemented using any suitable data storage technology, such as semiconductor based memory devices, flash memory, magnetic memory devices and systems, optical memory devices and systems, fixed memory and removable memory. The DPs 720A, 720A, 740A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

The invention claimed is:

1. An apparatus comprising:
    at least one processor; and
    at least one memory including computer program code, the at least one memory and the computer program code configured to, with the at least one processor, cause the apparatus to at least:
        receive, at a first radio access network node serving a first device-to-device area and from a first user equipment in the first device-to-device area, a request for keys for a device-to-device communication between the first user equipment and a second user equipment, wherein the request comprises an identification of a second device-to-device area where the second user equipment is located, the second device-to-device area being different from the first device-to-device area, the apparatus comprising or comprised in the first radio access network node;
        identify a second radio access network node serving the second device-to-device area based on the identification;
        send, to the second radio access network node, a request for a security context of the second user equipment;
        receive, from the second radio access network node, the security context for obtaining the keys for the device-to-device communication; and
        derive, based on the received security context of the second user equipment, the keys for the device-to-device communication.

2. An apparatus of claim 1, wherein the security context of the second user equipment comprises a user apparatus-specific key which is shared between the second user equipment and the second radio access network node.

3. An apparatus of claim 1, wherein the apparatus is further caused to at least:
    send the keys for the device-to-device communication to the first user equipment, and wherein the first radio access network node comprises a base station.

4. An apparatus of claim 1, wherein the first radio access network node is an enhanced Node B coupled to, or including, a device-to-device registration server function server, and/or the second radio access network node is an enhanced Node B coupled to, or including, a device-to-device registration server function server.

5. An apparatus comprising:
    at least one processor; and
    at least one memory including computer program code, the at least one memory and the computer program code configured to, with the at least one processor, cause the apparatus to at least:
        receive, at a first user equipment, a notification of device-to-device services from a second user equipment, wherein the notification comprises an identification of a second device-to-device area where the second user equipment is located, and the first user equipment is in a first device-to-device area different from the second device-to-device area, the apparatus comprising or comprised in the first user equipment;
        send, to a first radio access network node serving the first device-to-device area, a request for keys for a device-to-device communication between the first user equipment and the second user equipment, wherein the request comprises the received identification so that a security context of the second user equipment is available for the first radio access network node from a second radio access network node serving the second device-to-device area; and
        in response to the request, receive the keys for the device-to-device communication which are derived by the first radio access network node based on the security context.

6. An apparatus of claim 5, wherein the security context of the second user equipment comprises a user apparatus-specific key which is shared between the second user equipment and the second radio access network node.

7. An apparatus of claim 5, wherein the apparatus is further caused to at least broadcast a notification of device-to-device services, wherein the notification indicates an identification of a device-to-device area where the first user equipment is located.

8. An apparatus comprising:
    at least one processor; and
    at least one memory including computer program code, the at least one memory and the computer program code configured to, with the at least one processor, cause the apparatus to at least:
        receive, at a first radio access network node and from a user equipment, a message indicating that the user equipment is going to move from a first device-to-device area served by the first radio access network node to a second device-to-device area served by a second radio access network node, the apparatus comprising or comprised in the first radio access network node; and in response to the message, forward a security context for device-to-device services of the user equipment to the second radio access network node.

9. An apparatus of claim 8, wherein the apparatus is further caused to at least:
receive, from the second radio access network node, an indication of releasing the security context for device-to-device services of the user equipment; and
remove the security context in response to the indication.

10. An apparatus of claim 8, wherein the message comprises an identification of the second device-to-device area.

11. An apparatus of claim 8, wherein the security context for device-to-device services of the user equipment comprises a user apparatus-specific key of the user equipment which is shared between the user equipment and the first radio access network node.

12. An apparatus of claim 11, wherein the apparatus is further caused to at least:
receive a relocated identification of the user equipment from a core network node; and
update the security context by associating the relocated identification with the user apparatus-specific key.

* * * * *